(12) United States Patent
Huang et al.

(10) Patent No.: US 10,055,047 B2
(45) Date of Patent: Aug. 21, 2018

(54) DRIVER INTEGRATED CIRCUIT, DRIVING METHOD, AND TOUCH DISPLAY SYSTEM

(71) Applicant: HIMAX TECHNOLOGIES LIMITED, Tainan (TW)

(72) Inventors: Guan-Ying Huang, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 360 days.

(21) Appl. No.: 14/751,153

(22) Filed: Jun. 26, 2015

(65) Prior Publication Data

US 2016/0283018 A1    Sep. 29, 2016

Related U.S. Application Data

(60) Provisional application No. 62/138,958, filed on Mar. 26, 2015.

(51) Int. Cl.
| | |
|---|---|
| *G06F 3/041* | (2006.01) |
| *G06F 3/044* | (2006.01) |
| *G09G 3/36* | (2006.01) |
| *G06F 3/0354* | (2013.01) |
| *G02F 1/1333* | (2006.01) |

(52) U.S. Cl.
CPC ........ *G06F 3/0416* (2013.01); *G06F 3/03545* (2013.01); *G06F 3/044* (2013.01); *G06F 3/0412* (2013.01); *G09G 3/3648* (2013.01); *G02F 1/13338* (2013.01); *G06F 2203/04101* (2013.01); *G06F 2203/04106* (2013.01); *G09G 2354/00* (2013.01)

(58) Field of Classification Search
CPC .. G06F 3/03545; G06F 3/0412; G06F 3/0416; G06F 3/044; G06F 2203/04101; G06F 2203/04106; G09G 3/3648; G09G 2354/00; G02F 1/13338
See application file for complete search history.

(56) References Cited

U.S. PATENT DOCUMENTS

| | | |
|---|---|---|
| 2010/0245286 A1 | 9/2010 | Parker |
| 2013/0027347 A1 | 1/2013 | Doi |
| 2013/0314109 A1 | 11/2013 | Kremin |
| 2014/0028616 A1 | 1/2014 | Furutani |
| 2014/0362026 A1* | 12/2014 | Chen ...................... G06F 3/044 345/174 |

(Continued)

FOREIGN PATENT DOCUMENTS

| | | |
|---|---|---|
| CN | 101334544 A | 12/2008 |
| CN | 103049156 A | 4/2013 |

(Continued)

*Primary Examiner* — Nelson Rosario
(74) *Attorney, Agent, or Firm* — Winston Hsu

(57) ABSTRACT

A driver integrated circuit (IC), arranged to selectively operate in a display mode, a self-capacitor mode and a mutual-capacitor mode when the driver IC is coupled to a touch display panel, wherein when the driver IC operates in the display mode, the driver IC outputs display data to a plurality of source lines of the touch display panel; when the driver IC operates in the self-capacitor mode, the driver controls the source lines to have a predetermined voltage; and when the driver IC operates in the mutual-capacitor mode, the driver IC sequentially sends an impulse signal to the source lines.

18 Claims, 8 Drawing Sheets

(56) References Cited

U.S. PATENT DOCUMENTS

| | | | |
|---|---|---|---|
| 2014/0368449 A1 | 12/2014 | Hu | |
| 2015/0028894 A1* | 1/2015 | Sleeman | G06F 3/044 324/662 |
| 2015/0062062 A1 | 3/2015 | Han | |
| 2015/0346889 A1* | 12/2015 | Chen | G06F 3/0416 345/174 |
| 2016/0026295 A1* | 1/2016 | Ogirko | G06F 3/0416 345/174 |

FOREIGN PATENT DOCUMENTS

| | | | |
|---|---|---|---|
| CN | 103076939 | A | 5/2013 |
| CN | 103257769 | A | 8/2013 |
| GB | 2499388 | A | 8/2013 |
| JP | 2011113558 | A | 6/2011 |
| JP | 2012150783 | A | 8/2012 |
| JP | 201333455 | A | 2/2013 |
| JP | 201337680 | A | 2/2013 |
| JP | 201441603 | A | 3/2014 |
| JP | 2014119919 | A | 6/2014 |
| JP | 2014-209361 | A | 11/2014 |
| JP | 2014229284 | A | 12/2014 |
| JP | 2014241049 | A | 12/2014 |
| JP | 201531552 | A | 2/2015 |
| JP | 201543200 | A | 3/2015 |
| JP | 2015210811 | A | 11/2015 |
| KR | 1020150027529 | A | 3/2015 |
| TW | 201222358 | A1 | 6/2012 |

\* cited by examiner

US 10,055,047 B2

DRIVER INTEGRATED CIRCUIT, DRIVING METHOD, AND TOUCH DISPLAY SYSTEM

CROSS REFERENCE TO RELATED APPLICATIONS

This application claims the benefit of U.S. provisional application No. 62/138,958 filed on Mar. 26, 2015 and incorporated herein by reference.

BACKGROUND OF THE INVENTION

1. Field of the Invention

The present invention relates to a touch display system, and more particularly, to a driver integrated circuit (IC), a touch display system comprising the driver IC, and an associated driving method.

2. Description of the Prior Art

In the field of capacitive touch detection, the volume of electronic devices such as smart phones or tablets is becoming thinner, which has pushed the development of capacitive touch detection into on-cell or even in-cell techniques from Indium Tin Oxide (ITO). In-cell touch detection can only be achieved by self-capacitor touch detection or mutual-capacitor touch detection due to the limitation of the panel architecture which cannot locate the touch point precisely.

SUMMARY OF THE INVENTION

One of the objectives of the present invention is to provide a driver IC, a touch display system comprising the driver IC which can employ mutual-capacitor touch detection and self-capacitor touch detection in one single panel, and an associated driving method applied in the touch display system.

According to an embodiment of the present invention, a driver IC is disclosed, wherein the driver IC is arranged to selectively operate in a display mode, a self-capacitor mode and a mutual-capacitor mode when the driver IC is coupled to a touch display panel, and when the driver IC operates in the display mode, the driver IC outputs display data to a plurality of source lines of the touch display panel; when the driver IC operates in the self-capacitor mode, the driver controls the source lines to have a predetermined voltage; and when the driver IC operates in the mutual-capacitor mode, the driver IC sequentially sends an impulse signal to the source lines.

According to an embodiment of the present invention, a driving method of a touch display panel is disclosed, wherein the driving method comprises the following steps: selectively operating in a display mode, a self-capacitor mode and a mutual-capacitor mode; when operating in the display mode, outputting display data to a plurality of source lines of the touch display panel; when operating in the self-capacitor mode, controlling the source lines to have a predetermined voltage; and when operating in the mutual-capacitor mode, sequentially sending an impulse signal to the source lines.

According to an embodiment of the present invention, a touch display system is disclosed, wherein the touch display system comprises a touch display panel and a driver IC, and the touch display panel comprises: a plurality of gate lines; a plurality of source lines, disposed above the gate lines, where the gate lines and the sources lines are intersected; and a plurality of common lines, disposed above the sources lines, wherein the common lines have a plurality of first sections and a plurality of second sections, and the first sections and second sections are intersected; and the driver IC, coupled to the touch display panel, is arranged to selectively operate in a display mode, a self-capacitor mode and a mutual-capacitor mode when the driver IC is coupled to a touch display panel, wherein when the driver IC operates in the display mode, the driver IC outputs display data to a plurality of source lines of the touch display panel; when the driver IC operates in the self-capacitor mode, the driver controls the source lines to have a predetermined voltage; and when the driver IC operates in the mutual-capacitor mode, the driver IC sequentially sends an impulse signal to the source lines.

According to another embodiment of the present invention, a touch display system is disclosed, wherein the touch display system comprises a touch display panel, a driver IC and a stylus, and the touch display panel comprises: a plurality of gate lines; a plurality of source lines, disposed above the gate lines, where the gate lines and the sources lines are intersected; and a plurality of common lines, disposed above the sources lines, wherein the common lines have a plurality of first sections and a plurality of second sections, and the first sections and second sections are intersected; and the driver IC, coupled to the touch display panel, is arranged to selectively operate in a display mode and a detecting mode when the driver IC is coupled to a touch display panel, wherein when the driver IC operates in the display mode, the driver IC outputs display data to a plurality of source lines of the touch display panel; and the stylus is arranged to touch the touch display panel and generate an impulse signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
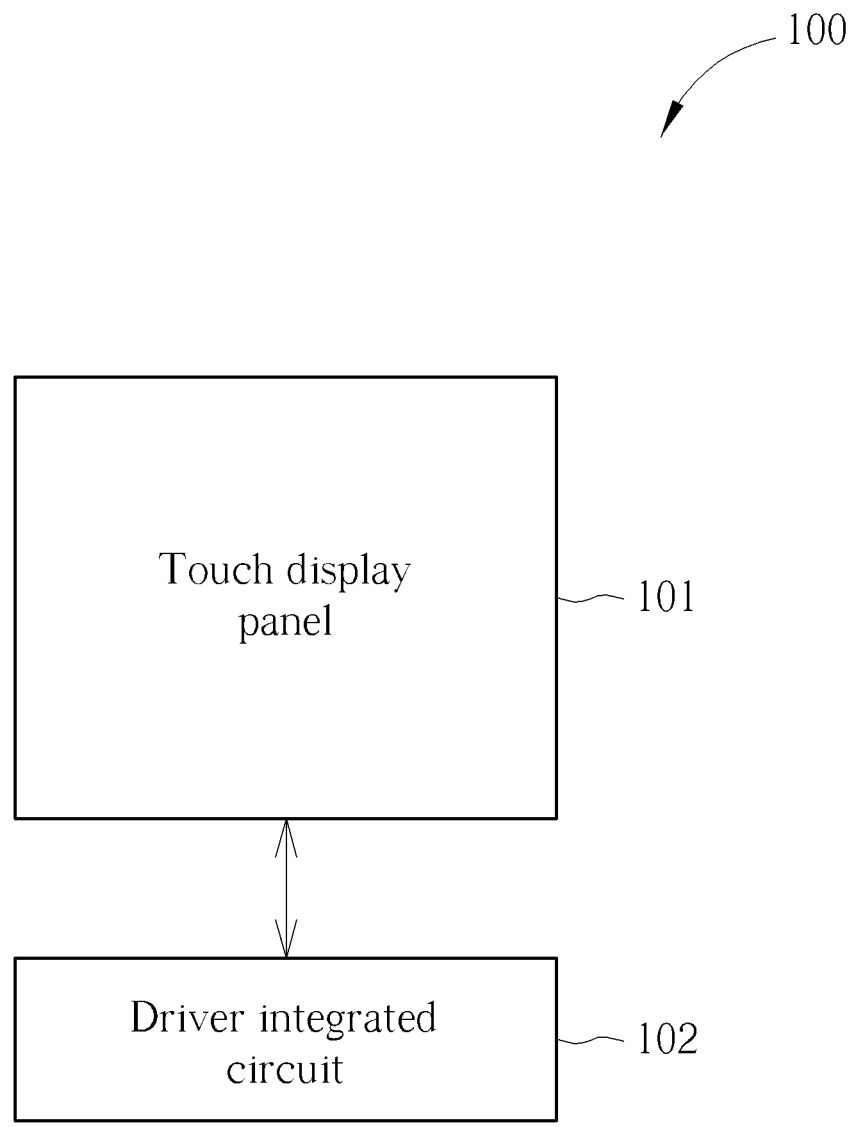
FIG. 1 is a diagram illustrating a touch display system according to an embodiment of the present invention.

FIG. 1 is a diagram illustrating a touch display system 100 according to an embodiment of the present invention, wherein the touch display system 100 comprises a touch display panel 101 and a driver integrated circuit (IC) 102. The touch display panel 101 can be applied in an electronic device such as a smart phone, a tablet, or any device comprising a touch display panel, and the driver IC 102 coupled to the touch display panel 101 can selectively operate in a display mode, a mutual-capacitor mode and a self-capacitor mode. The detailed description of the touch display panel 101 and the driver IC 102 are described in the following.

Figure 2A:
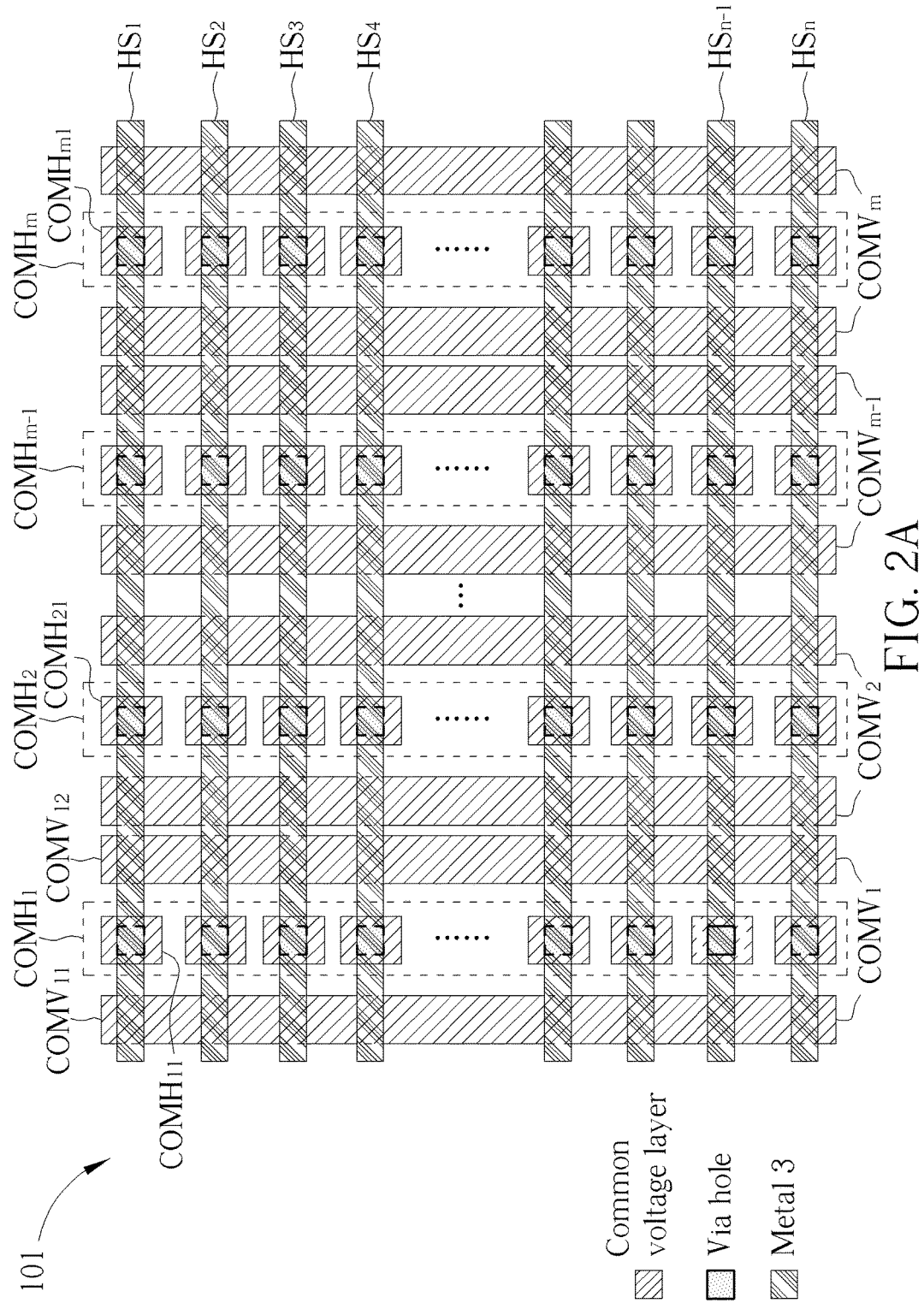
FIG. 2A is a diagram illustrating a common voltage layer of a display panel according to an embodiment of the present invention.
Figure 2B:
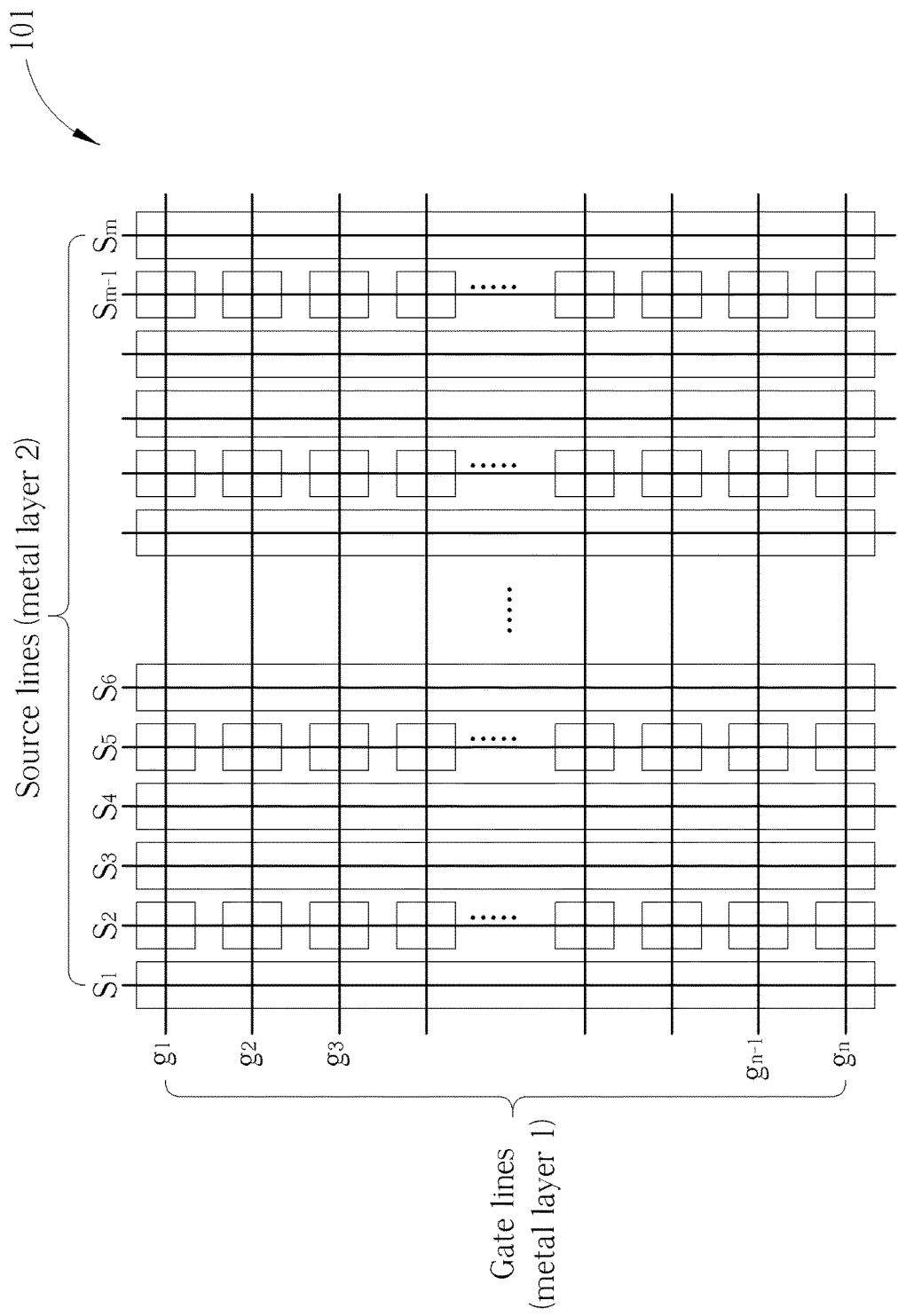
FIG. 2B is a diagram illustrating source lines and gate lines underneath the common voltage layer according to an embodiment of the present invention.

FIGS. 2A and 2B illustrate the architecture of the touch display panel 101, wherein FIGS. 2A and 2B are diagrams illustrating a common voltage layer of the touch display panel 101 and source lines and gate lines underneath the common voltage layer of the touch display panel 101 according to an embodiment of the present invention. As shown in FIGS. 2A and 2B, the touch display panel 101 comprises a first metal layer, a second metal layer, and a common voltage layer. In FIG. 2A, the common voltage layer can be divided into a plurality of vertical sections COMV1 to COMV$_m$ and a plurality of horizontal sections COMH1 to COMH$_m$, wherein each of the plurality of vertical sections COMV1 to COMV$_m$ comprises two vertical segments, e.g. the vertical segments COMV$_{11}$ and COMV$_{12}$ shown in FIG. 2A, and each of the plurality of horizontal sections COMH1 to COMH$_m$ comprises a plurality of horizontal segments, wherein the first segments of the plurality of horizontal segments of each horizontal section, e.g. the segments COMH$_{11}$, COMH$_{21}$, . . . , and COMH$_{m1}$ shown in FIG. 2A, are connected together via a third metal layer disposed above the common voltage layer to constitute a horizontal set HS1 shown in FIG. 2A. Likewise, the second segments of the plurality of horizontal segments of each horizontal section are connected together via the third metal layer to constitute a horizontal set HS2, and so on. The plurality of horizontal sets HS1 to HSn and the plurality of vertical segments are coupled to the driver IC 102.

As shown in FIG. 2B, the second metal layer underneath the common voltage layer comprises a plurality of source lines S$_1$ to S$_j$, where each source line substantially corresponds to one of the plurality of vertical segments or one of the plurality of horizontal sections, and the plurality of source lines S$_1$ to S$_j$ are coupled to the driver IC 102 and arranged for receiving the display data, a predetermined voltage, or an impulse signal generated by the driver IC according to the mode the driver IC operates in. The first metal layer is underneath the second metal layer and comprises a plurality of gate lines g$_1$ to g$_j$, wherein the plurality of source lines S1-Sm and the plurality of gate lines g1-gn are intersected as shown in FIG. 2B.

Figure 3:
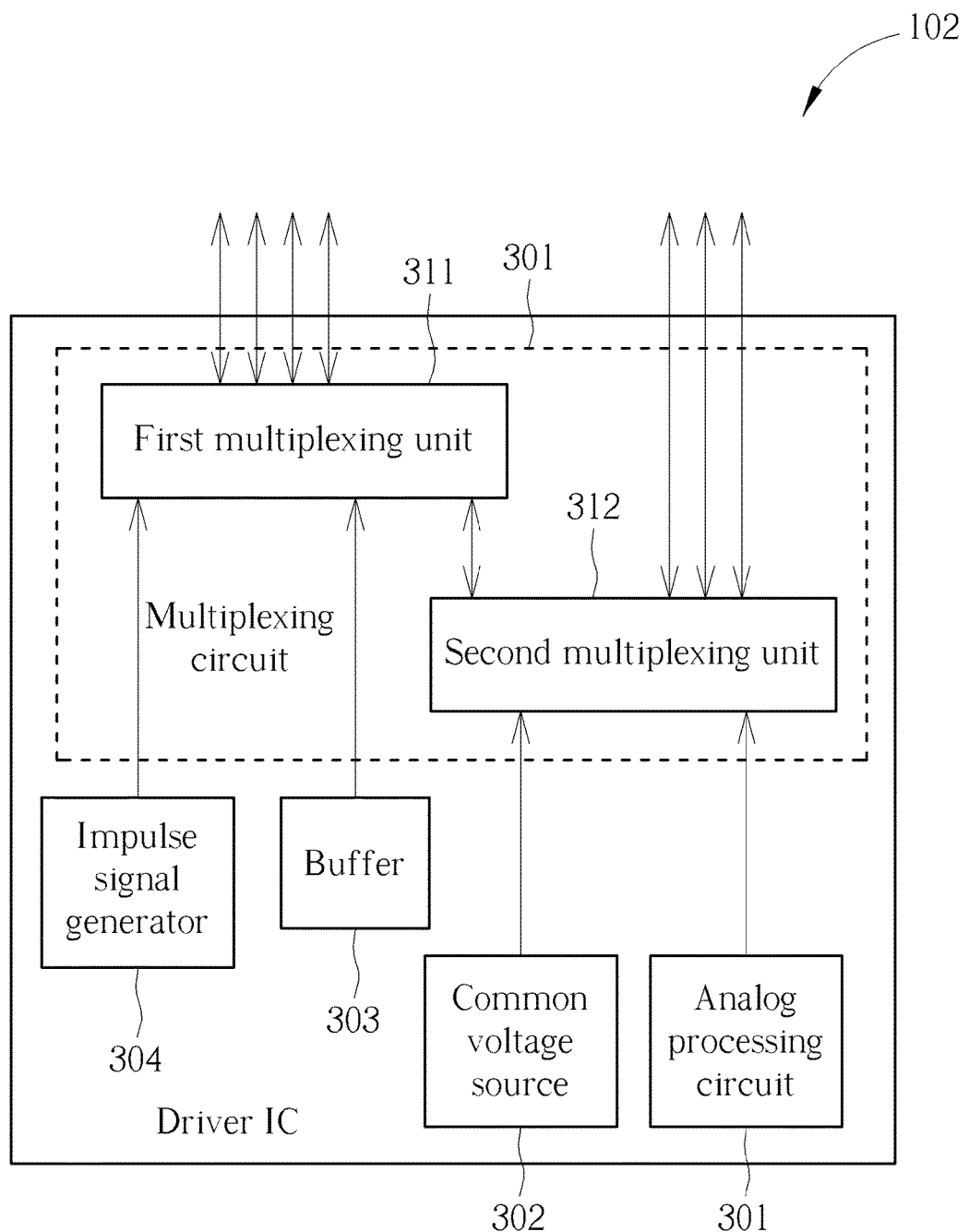
FIG. 3 is a diagram illustrating a driver IC applied to the touch display system 100 according to an embodiment of the present invention.

FIG. 3 is a diagram illustrating a driver IC 102 applied to the touch display system 100 according to an embodiment of the present invention, wherein the driver IC comprises a multiplexing circuit 301, a common voltage source 302, a buffer 303, an impulse signal generator 304 and an analog processing circuit 305. The common voltage source 302 is arranged for providing a common voltage to the common voltage layer, i.e. to the plurality of vertical segments and the plurality of horizontal sections, the buffer 303 is arranged for storing the display data, the impulse signal generator 304 is arranged for generating an impulse signal to the plurality of source lines sequentially, and the analog processing circuit 305 comprising an analog front end and a plurality of analog-to-digital converters is arranged for processing the signals received from the plurality of horizontal sets and the plurality of vertical segments. The multiplexing circuit 301 is coupled to the common voltage source 302, the buffer 303, the impulse signal generator 304 and the analog processing circuit 305, and is arranged for controlling the signals outputted to or received from the plurality of vertical segments, the plurality of horizontal sets and the plurality of source lines. In addition, the multiplexing circuit 301 comprises a first multiplexing unit 311 and a second multiplexing unit 312, wherein the first multiplexing unit 311 is coupled to the plurality of vertical segments and the plurality of source lines S1-Sm, and the second multiplexing unit 312 is coupled to the first multiplexing unit 312 and the plurality of horizontal sets as shown in FIG. 3.

When the driver IC 102 operates in the display mode, the multiplexing circuit 301 controls the common voltage layer, i.e. the plurality of vertical segments and the plurality of horizontal sections, to have the common voltage provided by the common voltage source 302, and also sends the display data stored in the buffer 303 to the plurality of source lines via the first multiplexing unit 311. In other words, in the display mode, the touch display panel 101 receives the display data from the driver IC 102 to show an image on a screen.

When the driver IC 102 operates in the mutual-capacitor mode, the first multiplexing unit 311 sequentially controls one of the plurality of vertical segments, e.g. COMV$_{11}$, to be floating and controls the other segments to connect to a reference voltage. In this case, the reference voltage has a very low voltage, such that it connects to ground. In addition, the first multiplexing unit 311 sends the impulse signal generated by the impulse signal generator 304 to one of the plurality of source lines S1-Sm corresponding to the floating vertical segment. Due to a capacitor between the source line and the corresponding floating vertical segment, the impulse signal can be coupled to the floating segment via the capacitor. The signals of the plurality of horizontal sets HS1 to HSn are sent to the analog processing circuit 305 via the second multiplexing unit 312. In this way, the capacitance variation (if any) between the source line corresponding to the floating vertical segment and carrying the impulse signal and the horizontal segment next to the floating vertical segment can be detected by detecting the signal of the horizontal set including the corresponding horizontal segment by the analog processing circuit 305. For example, if the horizontal segment COMH$_{11}$ is touched, when the vertical segment COMV$_{11}$ is controlled to be floating by the multiplexing circuit 301 and the impulse signal is sent to the source line S$_1$ corresponding to the vertical segment COMV$_{11}$, the impulse signal thus couples to the vertical segment COMV$_{11}$ and the capacitance between the horizontal segment COMH$_{11}$ and the source line S$_1$ is varied accordingly. Then, the capacitance variation is detected by the analog processing circuit 305 via the signal of the horizontal set HS1. The detailed illustration of capacitance variation of the mutual-capacitor mode will be discussed in FIG. 4.

When the driver IC 102 operates in the self-capacitor mode, the multiplexing circuit 301 transmits the signals of the plurality of vertical segments to the analog processing circuit 305 via the first multiplexing unit 311 and the second multiplexing unit 312, and controls the plurality of horizontal sets to be floating. In addition, the first multiplexing unit 311 controls the plurality of source lines to have a predetermined voltage. In this way, the capacitance variation between a vertical segment and a next horizontal section, the vertical segment and the corresponding source line, and the vertical segment and the corresponding gate line is detected by the analog processing circuit 305 via the signal of the vertical segment. For example, when the driver IC 102 operates in the self-capacitor mode, if the vertical segment $COMV_{11}$ is touched, the capacitance variations between the vertical segment $COMV_{11}$ and the horizontal section COMH1, the vertical segment $COMV_{11}$ and the corresponding source line $S_1$, and the vertical segment $COMV_{11}$ and the corresponding gate line $g_1$ are detected by the analog processing circuit 305. A detailed illustration of capacitance variation of the self-capacitor mode is provided by FIG. 4.

When the driver IC operates in the self-capacitor mode, it is not limited to transmit the signals of the plurality of vertical segments to the analog processing circuit 305 and make the plurality of horizontal sets floating. In another embodiment of the present invention, in self-capacitor mode, the signals of the plurality of horizontal sets are sent to the analog processing 305 via the second multiplexing unit 312, and the first multiplexing unit 311 controls the plurality of vertical segments to be floating, which can also achieve the same desired goal. The operation is similar to the description in the above paragraphs, and is therefore omitted here.

In the self-capacitor mode, the plurality of source lines and the plurality of gate lines can be controlled to be floating or to have the same voltage as the plurality of horizontal sets (or the plurality of vertical segments, based on which part is connected to the analog processing circuit 305) instead of having the predetermined voltage. This can reduce the equivalent capacitance seen from the vertical segments and the horizontal segments to avoid the detected signal being too small.

Figure 4:
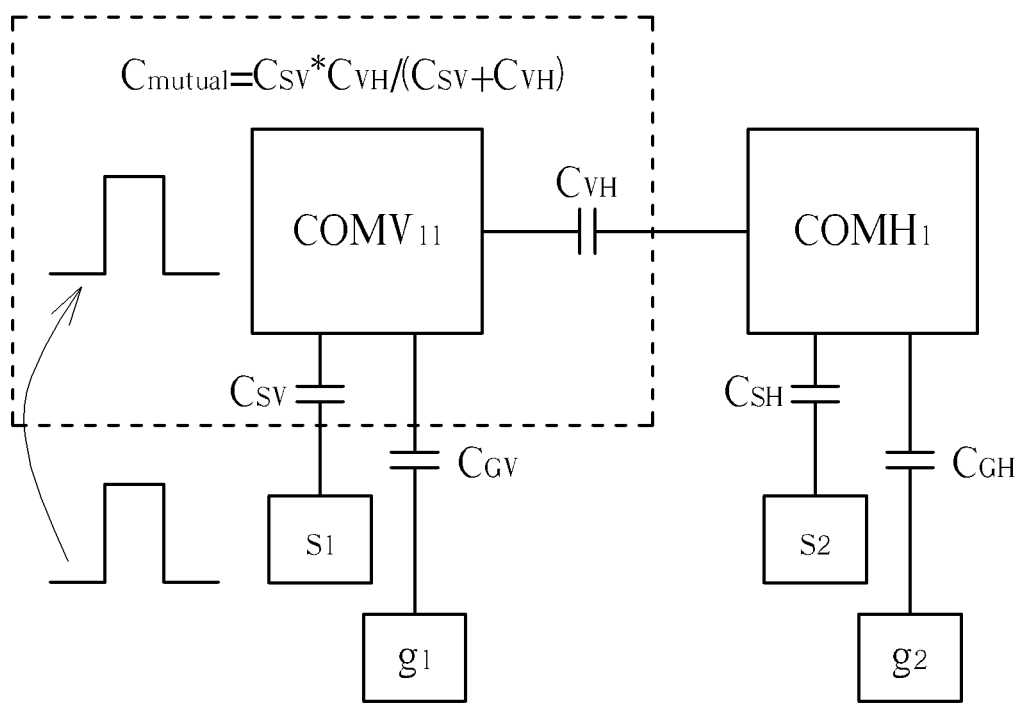
FIG. 4 is a diagram illustrating the capacitance variation of a mutual-capacitor mode and a self-capacitor mode according to an embodiment of the present invention.

FIG. 4 is a diagram illustrating the capacitance variation of a mutual-capacitor mode and a self-capacitor mode according to an embodiment of the present invention. As shown in FIG. 4, and assuming that the driver IC operates in the mutual-capacitor mode, the vertical segment $COMV_{11}$ is controlled to be floating, and the impulse signal is coupled to the vertical segment $COMV_{11}$ from the source line $S_1$. At this time, the equivalent capacitance between the horizontal section $COMH_1$ and the source line $S_1$ is $C_{mutual}=C_{SV}*C_{VH}/(C_{SV}+C_{VH})$ as shown in FIG. 4; assuming the driver IC operates in the self-capacitor mode, if the capacitance between the vertical segment $COMV_{11}$ and the source line $S_1$ (i.e. $C_{SV}$), the vertical segment $COMV_{11}$ and the gate line $g_1$ (i.e. $C_{SV}$), and the vertical segment $COMV_{11}$ and the horizontal section $COMH_1$ (i.e. $C_{VH}$) changes, the analog processing circuit 305 will detect the variation.

Figure 5:
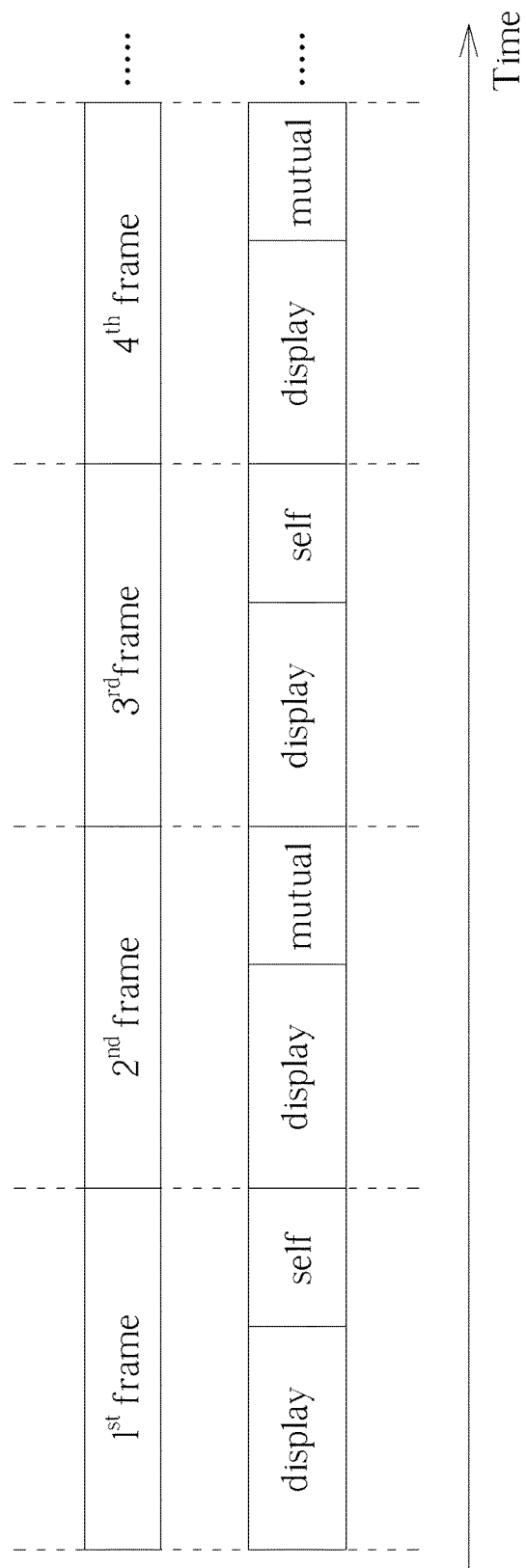
FIG. 5 is a timing diagram illustrating the timing arrangement for a display mode, a mutual-capacitor mode and a self-capacitor mode according to an embodiment of the present invention.

FIG. 5 is a timing diagram illustrating the timing arrangement for a display mode, a mutual-capacitor mode and a self-capacitor mode according to an embodiment of the present invention. As shown in FIG. 5, in each frame, the display mode occupies a portion of period and the detecting mode occupies the rest of the period. In addition, the mutual-capacitor mode and the self-capacitor mode are sequentially employed in frames for detecting. In this embodiment, in the first frame, the display mode occupies 66% of the period of the first frame and the self-capacitor mode occupies 34% of the period; in the second frame, the display mode occupies 66% of the period of the second frame, and the mutual-capacitor mode occupies 34% of the period of the second frame, and so on. The lengths of the display mode and the detecting mode here are only for illustrative purposes, and are not a limitation of the present invention. Any suitable length which can achieve the best performance falls within the scope of the present invention.

Figure 6:
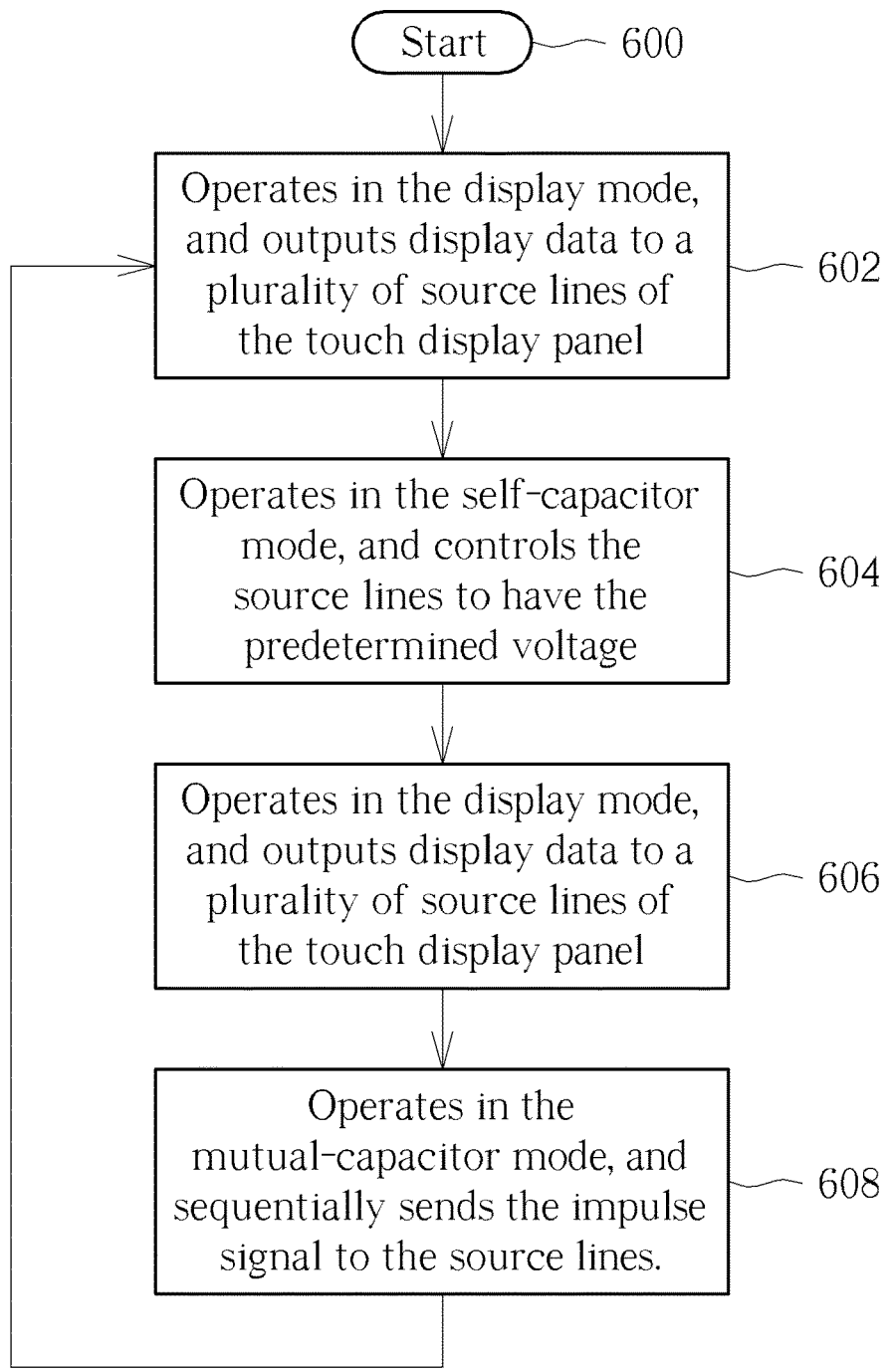
FIG. 6 is a flowchart illustrating a driving method applied to a touch display system according to an embodiment of the present invention.

FIG. 6 is a flowchart illustrating a driving method applied to a touch display system according to an embodiment of the present invention, wherein if the result is substantially the same, the steps are not required to be executed in the exact order shown in FIG. 6. The flow can be described as follows:

Step 600: flow starts.

Step 602: the driver IC 102 operates in the display mode for a portion (e.g. 66%) of the period of a frame, and outputs the display data to the plurality of source lines; go to step 604.

Step 604: the driver IC 102 operates in the self-capacitor mode for the rest (e.g. 34%) of the period of the frame, and controls the plurality of source lines to have the predetermined voltage; go to step 606.

Step 606: the driver IC 102 operates in the display mode for a portion (e.g. 66%) of the period of another frame, and outputs the display data to the plurality of source lines; go to step 608.

Step 608: the driver IC 102 operates in the mutual-capacitor mode for the rest (e.g. 34%) of the period of the frame, and sequentially sends the impulse signal to the source lines; go back to step 602.

Figure 7:
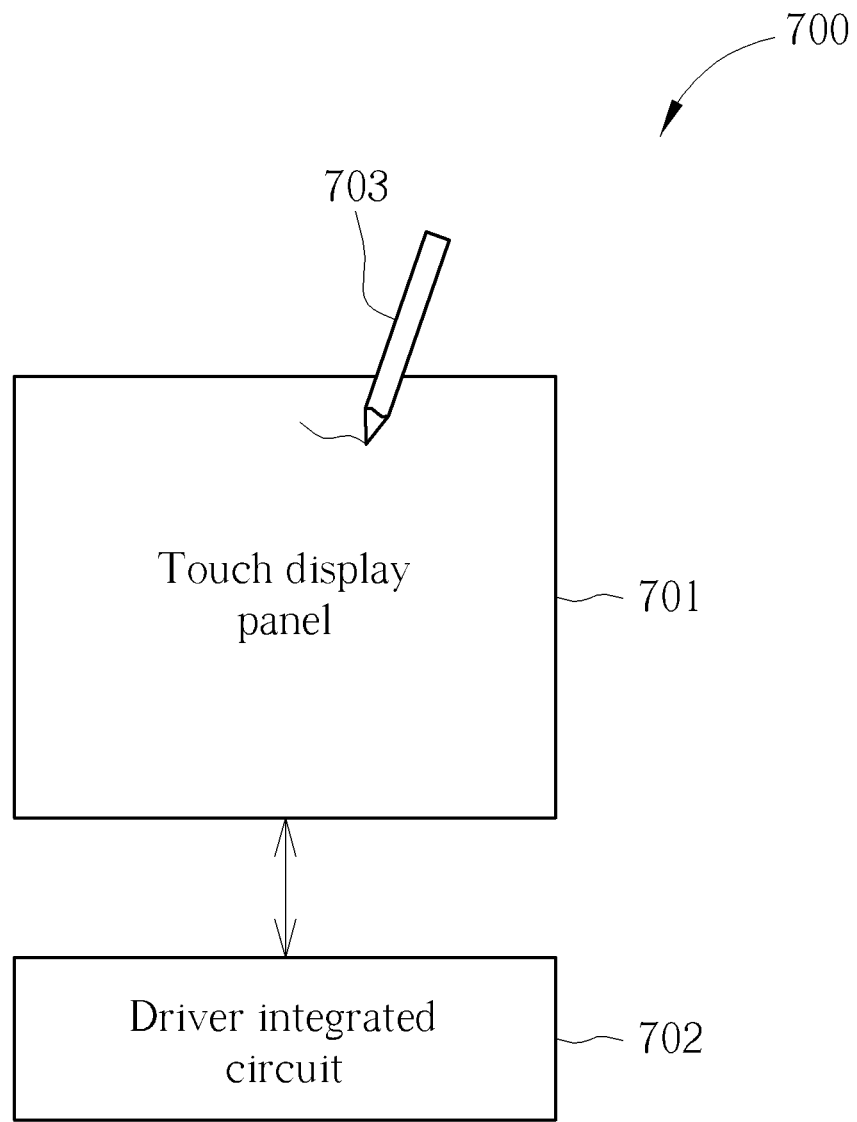
FIG. 7 is a diagram illustrating a touch display system according to another embodiment of the present invention.

FIG. 7 is a diagram illustrating a touch display system 700 according to another embodiment of the present invention, wherein the touch display system 700 comprises a touch display panel 701, a driver IC 702, and a stylus 703. The touch display panel 701 is identical with the touch display panel 101, so the detailed description of the touch display panel 701 can be known by referring to the embodiments of FIGS. 2A and 2B. In this embodiment, the stylus 703 can be an impulse signal generator such as the impulse signal generator 304 in the driver IC 102 described in the embodiment of FIG. 3. Apart from the impulse signal generator, the driver IC 702 is similar to the driver IC 102. When the driver IC 702 operates in a display mode, the operation of the touch display system 700 is identical to that of the touch display system 100. When the driver IC 702 operates in a detecting mode as the mutual-capacitor mode described above, the stylus 703 replaces the impulse signal generator 304 in the embodiment of FIG. 3 and is also used to touch the touch display panel 701. The person skilled in the art should understand the detailed implementation of this embodiment after reading the embodiments in the above paragraphs.

It is noted that the schematic of the common voltage layer of the touch display panels 101 and 701 are not limited to those described in the embodiments of FIGS. 1 and 7, as long as both the mutual-capacitor mode and the self-capacitor mode can be employed. The architecture of the multiplexing circuit 301 is not limited here either, as long as the multiplexing circuit can implement the abovementioned functions as described in the embodiment of FIG. 3. These alternative designs also fall within the scope of the present invention.

Briefly summarized, the present invention discloses a driver IC, a touch display system and a driving method, which can employ both the mutual-capacitor mode and the self-capacitor mode and precisely locate a touched point to solve the problems in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver integrated circuit (IC), arranged to selectively operate in a display mode, a self-capacitor mode and a mutual-capacitor mode when the driver IC is coupled to a touch display panel, wherein when the driver IC operates in the display mode, the driver IC outputs display data to a plurality of source lines of the touch display panel; when the driver IC operates in the self-capacitor mode, the driver controls the source lines to have a predetermined voltage; and when the driver IC operates in the mutual-capacitor mode, the driver IC sequentially sends an impulse signal to the source lines, wherein when the driver IC operates in the display mode, the driver IC controls common lines of the touch display panel to have a common voltage; and when the driver IC operates in the mutual-capacitor mode, a first section of the common lines are sequentially floating, and the common lines are different from the plurality of source lines, the first section of the common lines comprise a plurality of common lines parallel to each other.

2. The driver IC of claim 1, wherein when the driver IC operates in the mutual-capacitor mode, the driver IC controls one of the first section of the common lines to be floating and the rest of the first section of the common lines to have a reference voltage, and the driver IC sends the impulse signal to one of the source lines corresponding to the one of the first section of the common lines which is floating.

3. The driver IC of claim 2, comprising:
a common voltage source, arranged to provide the common voltage;
an impulse signal generator, for generating the impulse signal;
a buffer, for storing the display data; and
a multiplexing circuit, coupled to the common voltage source, the impulse signal generator and the buffer, for selectively outputting the display data, the predetermined voltage or the impulse signals to the source lines of the display panel, and for selectively outputting the common voltage, the first reference voltage or the second reference voltage to the first section of the common lines or making the first section of the common lines be floating.

4. The driver IC of claim 3, wherein the multiplexing circuit is further arranged for selectively outputting the common voltage to a second section of the common lines of the touch display panel or receiving sensed voltages from the second section of the common lines, the second section of the common lines comprises a plurality of common lines and the second section of the common lines and the first section of the common lines are intersected.

5. The driver IC of claim 4, wherein when the driver IC operates in the self-capacitor mode, the multiplexing circuit is further arranged for receiving sensed voltage from the first section of the common lines.

6. A driving method of a touch display panel, comprising:
selectively operating in a display mode, a self-capacitor mode and a mutual-capacitor mode;
when operating in the display mode, outputting display data to a plurality of source lines of the touch display panel;
when operating in the self-capacitor mode, controlling the source lines to have a predetermined voltage; and
when operating in the mutual-capacitor mode, sequentially sending an impulse signal to the source lines;
when operating in the display mode, controlling common lines of the touch display panel to have a common voltage;
when operating in the self-capacitor mode, controlling a first section of the common lines to have a reference voltage, wherein the first section of the common lines comprise a plurality of common lines parallel to each other; and
when operating in the mutual-capacitor mode, the first section of the common lines are sequentially floating;
wherein the common lines are different from the plurality of source lines.

7. The driving method of claim 6, wherein when operating in the mutual-capacitor mode, controlling one of the first section of the common lines to be floating and the rest of the first section of the common lines to have a second reference voltage, and sending the impulse signal to one of the source lines corresponding to the one of the first section of the common lines which is floating.

8. The driving method of claim 7, further comprising:
when operating in the display mode, outputting the common voltage to a second section of the common lines of the touch display panel, wherein the second section of the common lines comprises a plurality of common lines and the second section of the common lines and the first section of the common lines are intersected; and
when operating in the self-capacitor mode and the mutual-capacitor mode, receiving sensed voltages from the second section of the common lines.

9. The driving method of claim 8, wherein when operating in the self-capacitor mode, receiving sensed voltage from the first section of the common lines.

10. A touch display system, comprising:
a touch display panel, comprising:
a plurality of gate lines;
a plurality of source lines, disposed above the gate lines, where the gate lines and the sources lines are intersected; and
a plurality of common lines, disposed above the sources lines, wherein the common lines have a plurality of first sections and a plurality of second sections, and the first sections and second sections are intersected;
a driver IC, coupled to the touch display panel, arranged to selectively operate in a display mode, a self-capacitor mode and a mutual-capacitor mode when the driver IC is coupled to a touch display panel, wherein when the driver IC operates in the display mode, the driver IC outputs display data to a plurality of source lines of the touch display panel; when the driver IC operates in the self-capacitor mode, the driver controls the source lines to have a predetermined voltage; and when the driver IC operates in the mutual-capacitor mode, the driver IC sequentially sends an impulse signal to the source lines; wherein when the driver IC operates in the display mode, the driver IC controls common lines of the touch display panel to have a common voltage; and when the driver IC operates in the mutual-capacitor mode, a first section of the common lines are sequentially floating, and the common lines are different from the plurality of source lines, the first section of the common lines comprise a plurality of common lines parallel to each other.

11. The touch display system of claim 10, wherein when the driver IC operates in the mutual-capacitor mode, the driver IC controls one of the first sections of the common lines to be floating and the rest of the first sections of the common lines to have a reference voltage, and the driver IC sends the impulse signal to one of the source lines corresponding to the one of the first sections of the common lines which is floating.

12. The touch display system of claim 11, comprising:
a common voltage source, arranged to provide the common voltage;
an impulse signal generator, for generating the impulse signal;
a buffer, for storing the display data; and
a multiplexing circuit, coupled to the common voltage source, the impulse signal generator and the buffer, for selectively outputting the display data, the predetermined voltage or the impulse signals to the source lines of the display panel, and for selectively outputting the common voltage or the reference voltage to the first sections of the common lines or making the portion of the common lines be floating.

13. The touch display system of claim 12, wherein the multiplexing circuit is further arranged for selectively outputting the common voltage to the second sections of the common lines of the touch display panel or receiving sensed voltages from the second sections of the common lines, the second section of the common lines comprises a plurality of common lines and the second section of the common lines and the first section of the common lines are intersected.

14. The touch display system of claim 13, wherein when the driver IC operates in the self-capacitor mode, the multiplexing circuit is further arranged for receiving sensed voltage from the first sections of the common lines.

15. A touch display system, comprising:
a touch display panel, comprising:
a plurality of gate lines;
a plurality of source lines, disposed above the gate lines, where the gate lines and the sources lines are intersected; and
a plurality of common lines, disposed above the sources lines, wherein the common lines have a plurality of first sections and a plurality of second sections, and the first sections and second sections are intersected;
a driver IC, coupled to the touch display panel, arranged to selectively operate in a display mode and a detecting mode when the driver IC is coupled to a touch display panel, wherein when the driver IC operates in the display mode, the driver IC outputs display data to a plurality of source lines of the touch display panel; and
a stylus, arranged to touch the touch display panel and generate an impulse signal;
wherein when the driver IC operates in the display mode, the driver IC controls common lines of the touch display panel to have a common voltage; and when the driver IC operates in the detecting mode, a first sections of the common lines are sequentially floating, and the common lines are different from the plurality of source lines, the first section of the common lines comprise a plurality of common lines parallel to each other.

16. The touch display system of claim 15, wherein when the driver IC operates in the detecting mode, the stylus sends the impulse signal to the common lines, and when one of the first sections under the point the stylus touched is floating, the impulse signal is coupled to the one of the first sections.

17. The touch display system of claim 16, comprising:
a common voltage source, arranged to provide the common voltage;
a buffer, for storing the display data; and
a multiplexing circuit, couple to the common voltage source and the buffer, for selectively outputting the display data, the predetermined voltage or the impulse signals to the source lines of the display panel, and for selectively outputting the common voltage or the reference voltage to the first sections of the common lines or making the portion of the common lines be floating.

18. The touch display system of claim 17, wherein the multiplexing circuit is further arranged for selectively outputting the common voltage to the second sections of the common lines of the touch display panel or receiving sensed voltages from the second sections of the common lines, the second section of the common lines comprises a plurality of common lines and the second section of the common lines and the first section of the common lines are intersected.

* * * * *